United States Patent [19]
Salvagnini

[11] Patent Number: 5,190,273
[45] Date of Patent: Mar. 2, 1993

[54] PALLET WITH ADJUSTABLE ANCHORAGE SYSTEM FOR EQUIPPING THE CLAMPING FIXTURE OF A ROUGH PIECE TO BE MACHINED WITH MACHINE TOOLS

[75] Inventor: Guido Salvagnini, Sarego, Italy
[73] Assignee: SZ s.r.l., Sarego, Italy
[21] Appl. No.: 684,507
[22] Filed: Apr. 15, 1991

Related U.S. Application Data

[63] Continuation of Ser. No. 278,717, Dec. 2, 1988, abandoned.

[30] Foreign Application Priority Data

Dec. 10, 1987 [IT] Italy .............................. 22932 A/87

[51] Int. Cl.$^5$ .......................................... B23Q 3/10
[52] U.S. Cl. ..................................... 269/309; 269/21; 269/101
[58] Field of Search .................. 269/20, 21, 309, 311, 269/101, 27, 30, 31, 32, 289 R

[56] References Cited

U.S. PATENT DOCUMENTS

| | | |
|---|---|---|
| 3,312,510 | 4/1967 | Brehm .................................. 269/309 |
| 4,088,312 | 5/1978 | Frosch et al. .......................... 269/21 |
| 4,174,828 | 11/1979 | Bergman .............................. 269/34 |
| 4,612,946 | 9/1986 | Noh et al. ............................. 269/309 |
| 4,743,001 | 5/1988 | Craft .................................... 269/309 |
| 4,786,776 | 11/1988 | Ramsbro ............................. 269/309 |

FOREIGN PATENT DOCUMENTS 3341542 5/1985 Fed. Rep. of Germany .

Primary Examiner—J. J. Swann
Attorney, Agent, or Firm—Cushman, Darby & Cushman

[57] ABSTRACT

The pallet includes one or more supporting faces, each of which is provided with an anchorage system for equipping the clamping fixture of a rough piece to be machined with machine tools. Each supporting face has one or more anchorage members for components of said clamping fixture. Each anchorage members may be adjusted as to height and as to angular orientation and is connected with a supply of fluid.

Said adjustment is carried out by screwing and unscrewing said anchorage members in corresponding appropriately threaded holes in the supporting faces of the pallet.

21 Claims, 8 Drawing Sheets

PALLET WITH ADJUSTABLE ANCHORAGE SYSTEM FOR EQUIPPING THE CLAMPING FIXTURE OF A ROUGH PIECE TO BE MACHINED WITH MACHINE TOOLS

This is a continuation of application Ser. No. 07/278,717, filed on Dec. 2, 1988, which is abandoned.

DESCRIPTION

The present invention refers to a pallet with an adjustable anchorage system for equipping the clamping fixture of a rough piece to be machined with machine tools.

In the field of machine tools pallets are those plates on which the pieces to be machined are clamped with appropriate fixtures and which are moved from one or more off stations to one or more machining, washing or measurement stations.

The known pallets have one or more supporting faces equipped with a plurality of threaded holes or grooves in which fixtures are directly engaged which can clamp on the pallet the rough pieces to be processed in different machining operations. Since such rough pieces have variable dimensions, it is necessary to have a tool store equipped with several sets of different dimensions so that, as occasion arises, those tools may be selected which are appropriate for clamping a given rough piece on the pallet; or it is necessary to design and manufacture specific fixtures. As a consequence, the cost of the clamping fixture is always high. In addition, the threaded holes of the known pallets are blind and the object of bolting of the fixtures onto these holes is merely to position them firmly but not to connect them to a supply of fluid for the operation of the fixtures.

In view of this state of the art, the main object of the present invention is to accomplish a pallet which eliminates the need to design specific fixtures and reduces the requirement of a tool store with many sets of fixtures, being itself adaptable as occasion demands to the dimensions of the rough piece to be clamped.

A further object of the present invention is to also accomplish a pallet whose anchorage means are connected together and themselves connect the fixture's components to a supply of fluid, so that the fastening of the components to the respective anchorage means involves a hydraulic connection for the operation of these components, finalized to the clamping of the piece to be machined.

According to the invention, such main object is attained by accomplishing a pallet for equipping the clamping fixture of a rough piece to be machined with machine tools, comprising one or more supporting faces equipped with threaded holes, characterized in that respective anchorage means adjustable in height and angular orientation for components of said clamping fixture are permanently inserted in said threaded holes.

In this way said anchorage means may protrude from the respective face of the pallet by a length which is adjustable in relation to the thickness or height of the rough piece to be clamped and they may also be angularly oriented for a correct positioning of the components of the clamping fixture.

Such adjustments are carried out by tightening or loosening the anchorage means in the respective threaded holes of the pallet's supporting faces.

With this arrangement, since the adjustment for height and angular orientation is carried out directly as part of the set-up of the pallet's clamping means, the components of the clamping fixture may be modular elements with a standard height and their number in the tool store can be reduced substantially, and the need for designing specific fixtures for the individual pieces is also avoided.

According to one preferred embodiment of the present invention there is also the possibility that the above anchorage means have passing coaxial holes through them in constant communication with a supply of fluid and closed, when required, by removable sealing plugs. In this way the anchorage means are in a position of also ensuring the hydraulic connection of the components fastened to them with the operating fluid of the components themselves.

One possible embodiment of the present invention is illustrated, as a non-limiting example, in the enclosed drawings, in which.

The pallet illustrated as an example in the drawings, where it is globally indicated with the numerical reference 1 (FIG. 1), comprises a base 2 with a standardized shape which can slide on conveyor guides (not shown) and which can be accurately fastened on the table of a machine tool, and at least one supporting face 3 equipped with a plurality of anchorage means 4. For the sake of simplicity a pallet is shown with only one supporting face, it being, however, obvious that the present invention is applicable to a pallet with two or five supporting faces, constituted by a vertical plate constrained to a horizontal cursor and by a parallelepiped constrained to a horizontal cursor, respectively.

Figure 2:
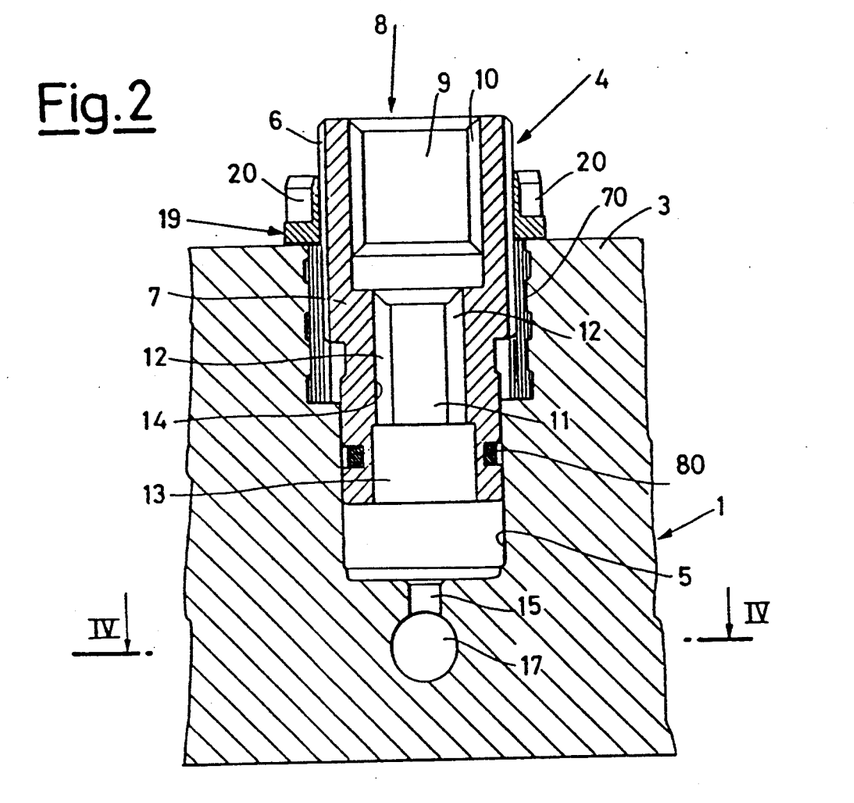
FIG. 2 is a cross-sectional view taken along the line II—II of FIG. 3 of an anchorage means included in the above pallet.
Figure 3:
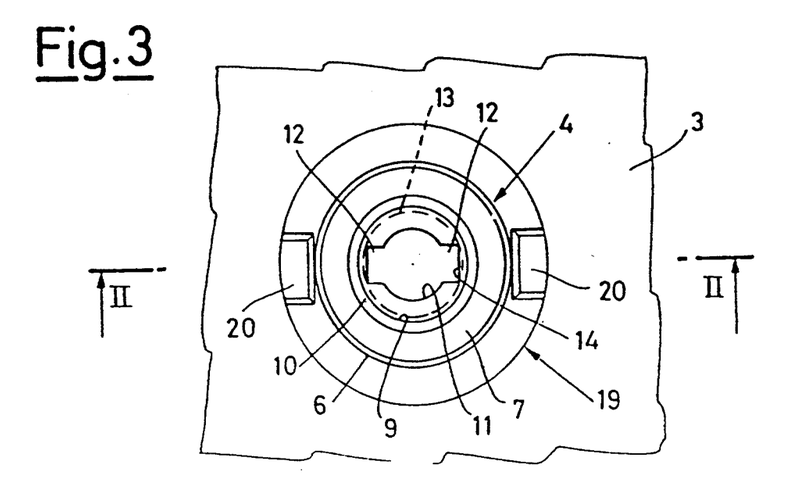
FIG. 3 is a plan view of the above anchorage means.

As shown in FIGS. 2 and 3, each anchorage means 4 is inserted in the pallet body by screwing. For this purpose holes 5 are appropriately distributed in the pallet body with an upper threaded part 70 and the anchorage means 4 have on the outer surface a corresponding thread 6.

According to the preferred embodiment illustrated in FIG. 2 the thread 70 is not obtained by chip machining, but by pouring a die resin; in this way, indeed, costs of accomplishment are substantially reduced.

Each anchorage means 4 (FIG. 2) has a substantially cylindrical body 7 comprising a passing coaxial hole 8 divided into an upper section 9 with an inner thread 10, a central section 11 with a smaller diameter equipped laterally with two symmetrical cavities 12 and a lower cylindrical section 13 (FIG. 3).

The central section 11 may also have a different shape, as long as it can engage rotationally with an appropriate screwing and unscrewing tool with a complementary shape.

Along the external surface of the lower section 13 there is a sealing gasket 80.

Figure 4:
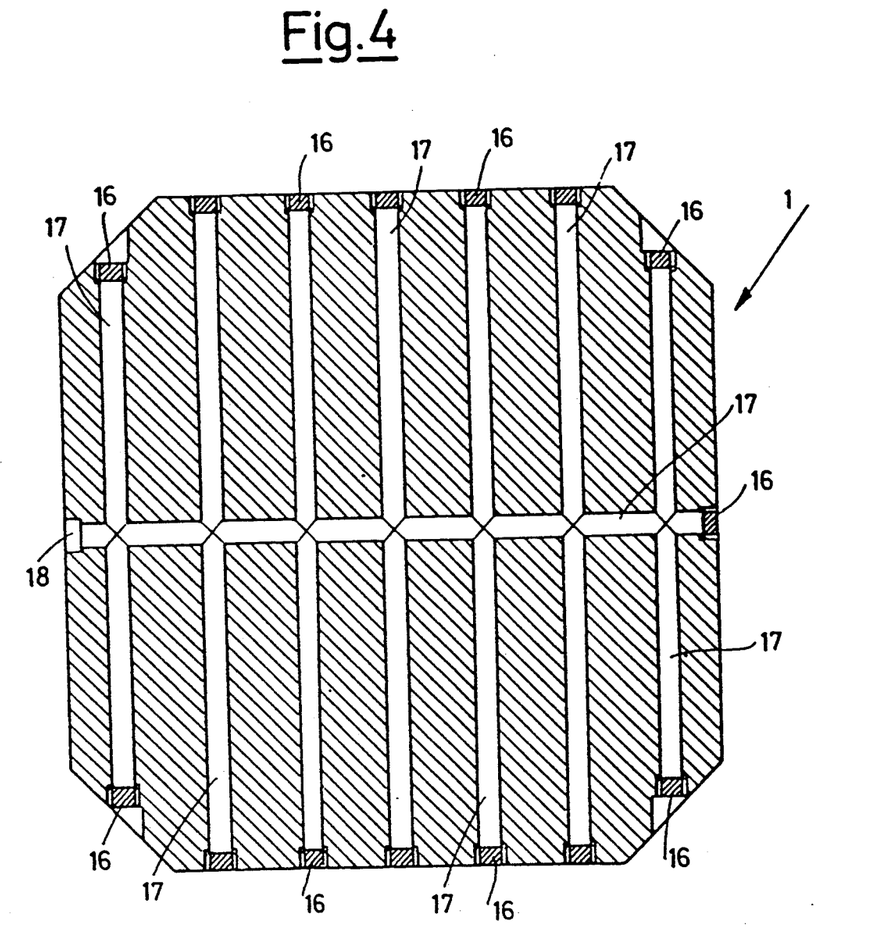
FIG. 4 is a cross-sectional view of the entire pallet taken along the line IV—IV of FIG. 2.

On the bottom of each hole 5 there is conduit 15 for connecting it to a set of channels 17 which extends in the body of the pallet (FIG. 4) for supplying the fluid to components described later. The channels 17, having the extremities sealed by plugs 16, constitute a single closed circuit with an open inlet 18 for the input of the fluid. As an alternative, there can be several separate circuits into which fluid may be pumped at different pressures.

On the external thread 6 of the anchorage means 4 there is a clamping ring nut 19 which, when tightened, clamps the cylindrical body 7 at any required height and in any angular position. The ring nut 19 has two symmetrical notches 20 which can be engaged by screwing and unscrewing means of the ring nut itself.

Figure 1:
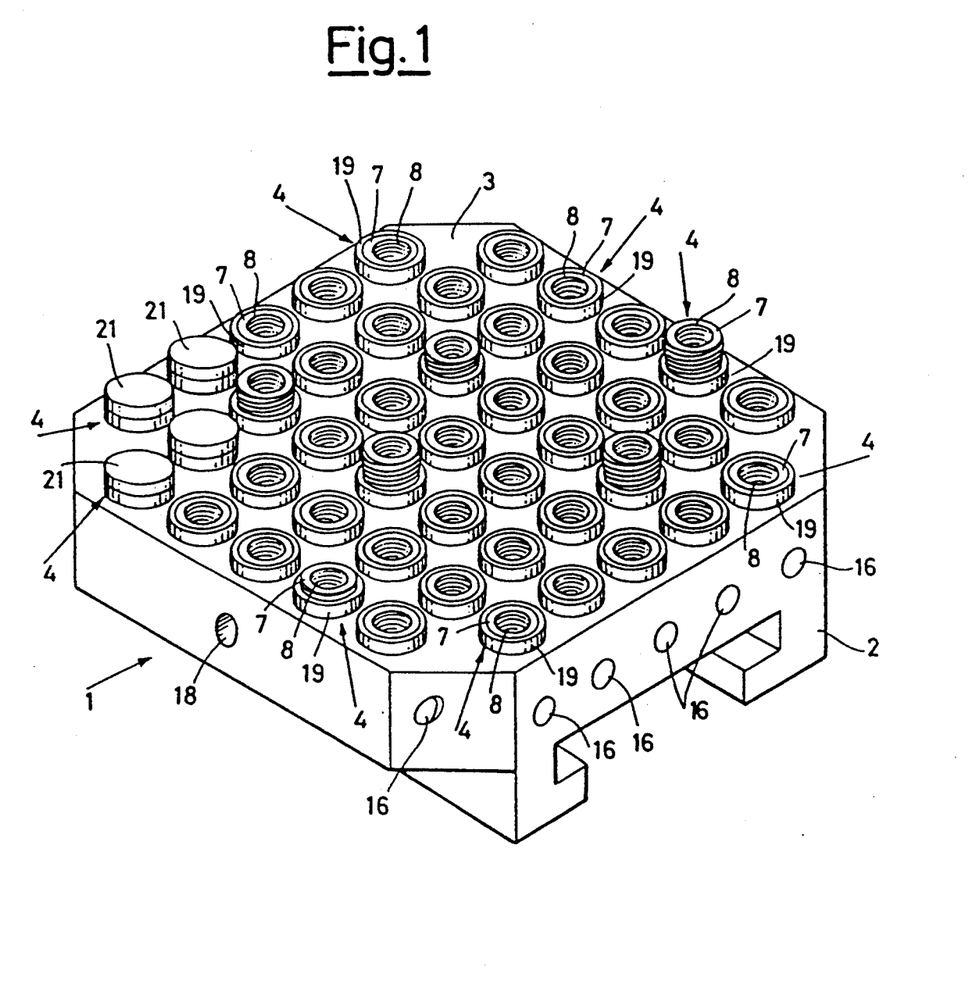
FIG. 1 is a perspective view of a pallet according to the invention.

With the pallet in the starting position for equipping operations, on the upper extremity of each anchorage means 4 there is already screwed a plug 21 with a gasket 85 to prevent oil issuing under pressure. In FIG. 1, for the sake of clarity, most plugs have been removed.

Figure 5:
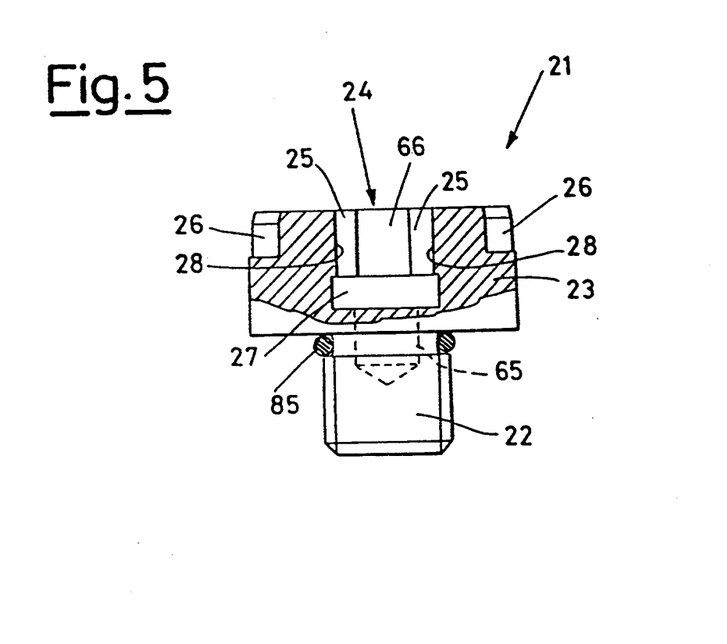
FIG. 5 is a cross-sectional view taken along the line V—V of FIG. 6 of a plug for the anchorage means illustrated in FIGS. 2 and 3.
Figure 6:
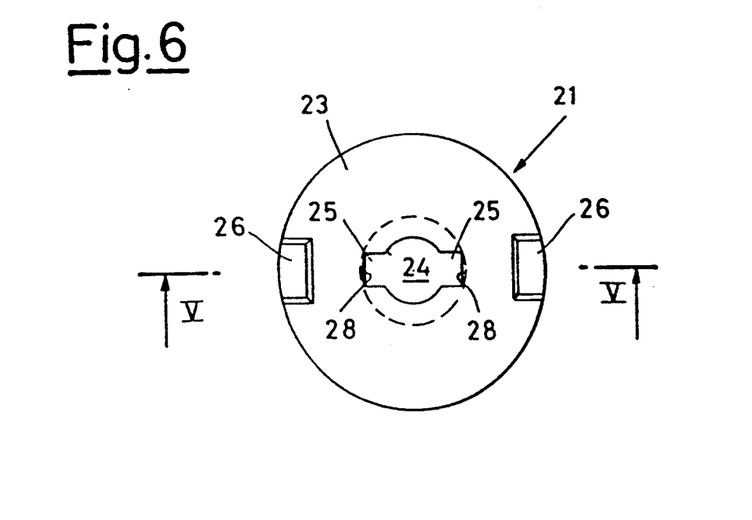
FIG. 6 is a plan view of the plug of FIG. 5.

As shown in FIGS. 5 and 6, each plug 21 is constituted by a lower threaded tang 22 which can be screwed into the upper threaded extremity 9 of the hole 8 and by an upper portion 23 with a larger diameter. The latter has a central cavity 24 and a pair of symmetrical notches 26 along its periphery.

The central cavity 24 has an upper section 66 with symmetrical cavities 25, an enlarged central section 27 and a blind terminal section 65.

Note that, in order to use the same screwing and unscrewing tool for the plug 21 and the ring nut 19, the outer diameter of the plug 21 is the same as that of the ring nut 19 of the anchorage means 4 and the notches 26 are both identical and identically arranged in relation to the notches 20. Moreover the sections 66 and 27 of the cavity 24 of the plug 21 have the same radial dimensions of the central section 11 and of the lower section 13 of the passing hole 8 of the anchorage means 4.

Figure 8:
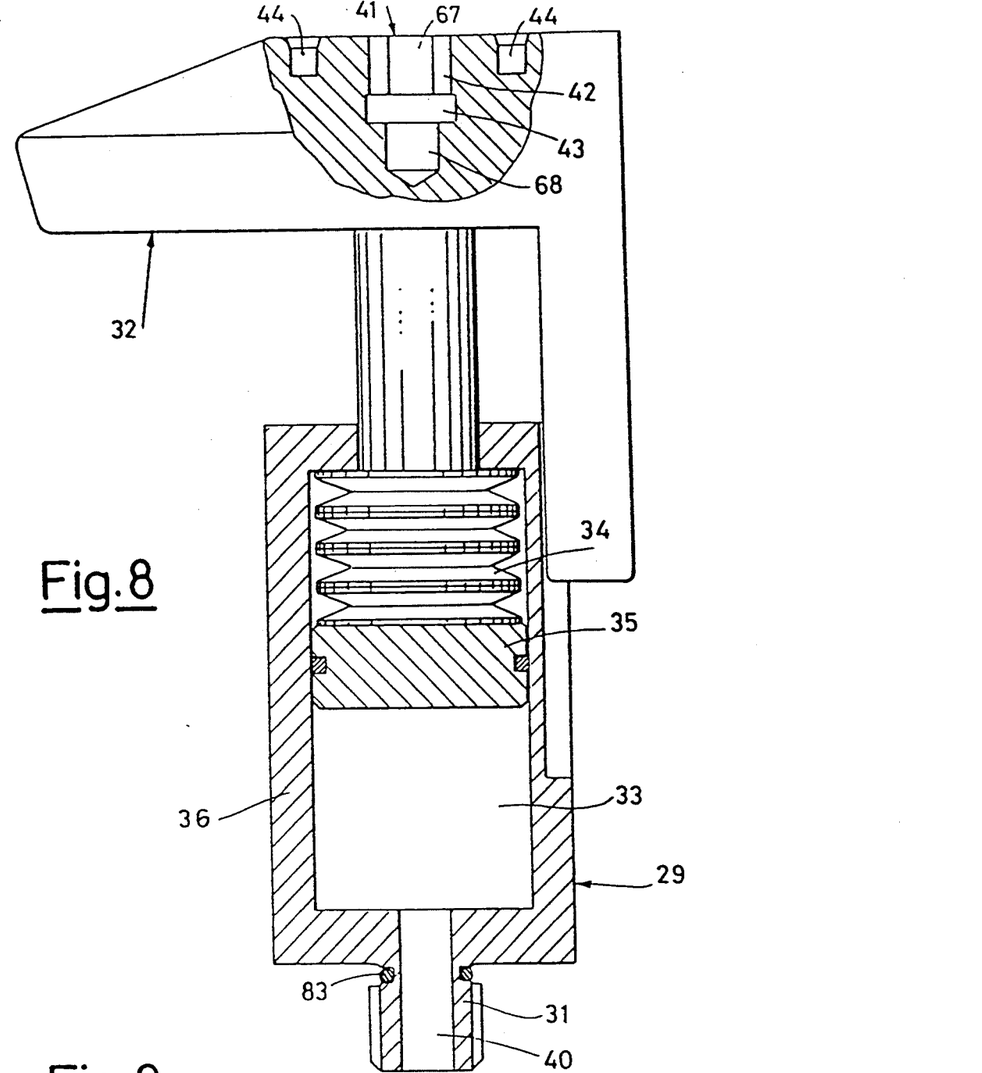
FIG. 8 is a lateral partially cross-sectional view of a modular clamping element.
Figure 9:
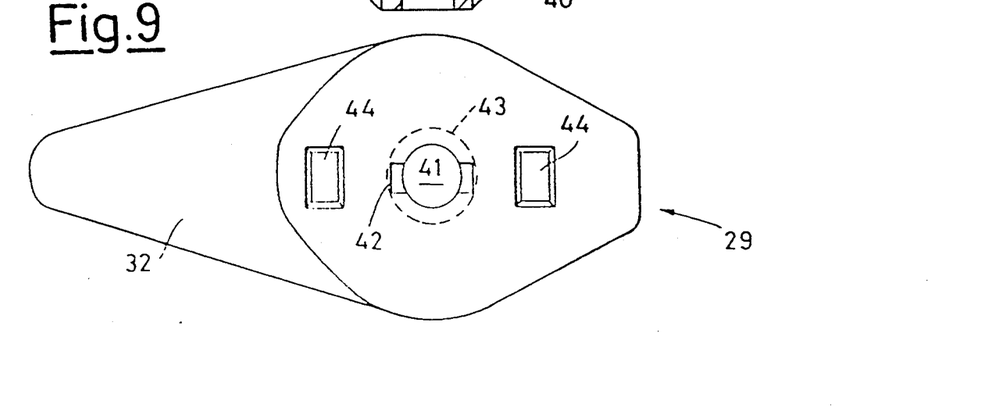
FIG. 9 is a plan view of the element of FIG. 8.

In the anchorage means 4 standard modular components are screwed, such as for example the clamping elements 29, the positioning elements 30 and the intermediate elements 82 shown in FIGS. 8, 9; 10, 11 and 12, 13, respectively and described below.

Each clamping element 29 comprises a body 36 equipped, in its lower part, with a threaded tang 31 which can be screwed into the upper threaded part 9 of the central hole 8 of the anchorage means 4 and, in its upper part, by a clamping bracket 32 which can slide along the vertical axis of the element 29.

The body 36 is hollow and in its cavity 33 there is a mechanism which can cause the translation of the bracket 32, constituted by a series of Belleville washers 34 and by a piston 35.

The cavity 33 communicates with a hole 40 inside the threaded tang 31. A gasket 83 seals the fluid outside the hole 40.

As is known, to operate the element 29, when it is applied to an anchorage means 4, the fluid from the hydraulic power supply is made to rise through the appropriate conduit 15 into the hole 5 and then into the passing hole 8 of the anchorage means 4, from where it reaches the conduit 40 of the clamping element 29 and enters the cavity 33 to raise the piston 35 and cause the corresponding rise of the bracket 32.

In the bracket 32 there is an axial cavity 41 divided into an upper section 67 with symmetrical lateral cavities 42, an enlarged central section 43 and a lower blind section 68 in all respects identical with those in the plug 21 of FIG. 5.

To the sides of the cavity 41 there are symmetrical notches 44 in turn arranged identically with the notches 26 of the plug 21.

The positioning element 30 (FIGS. 10 and 11) is constituted by a body 45 with, at its lower end, a threaded tang 46 with sealing gasket 86, which can screw into the upper threaded part 9 of the central hole 8 of the anchorage means 4 and, at its upper end, a cavity 47. The latter is divided into an upper section 71 with lateral cavities 48, an enlarged central section 49 and a lower blind section 72 in all respects identical with those on the bracket 32 of the clamping element 29 and on the plug 21.

Figure 10:
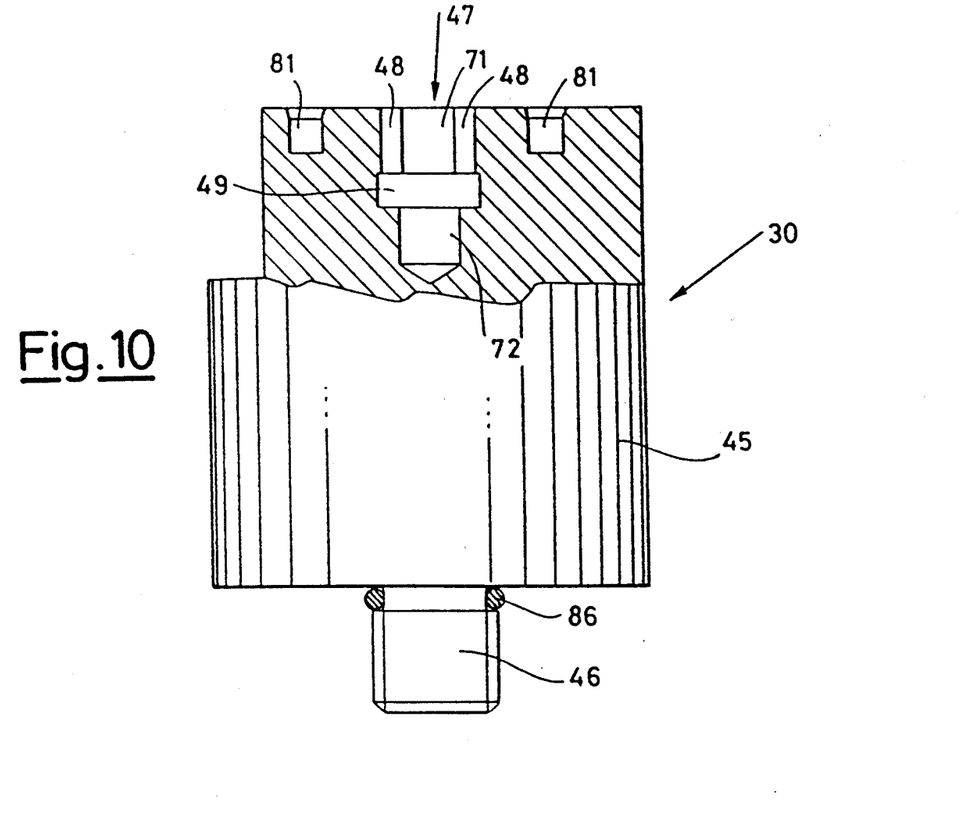
FIG. 10 is a lateral partially cross-sectional view of a modular positioning element.
Figure 11:
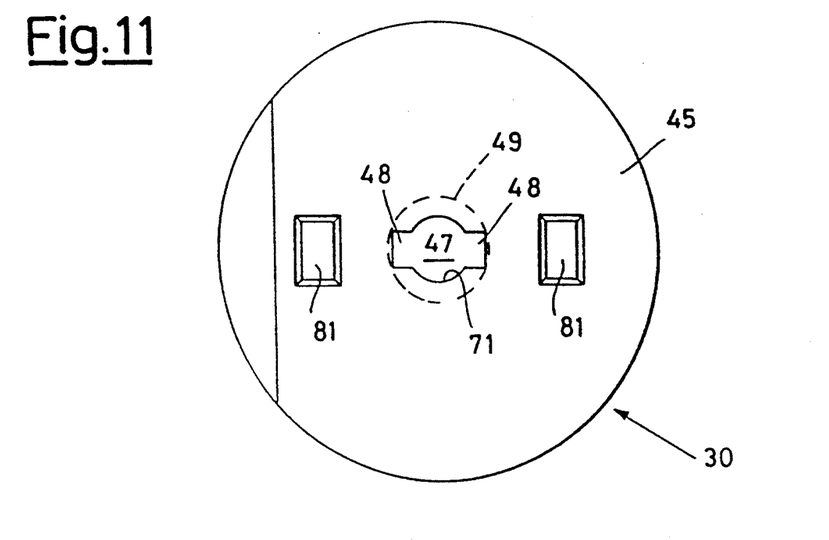
FIG. 11 is a plan view of the element of FIG. 10.

At the side of said cavity 47 there are two notches 81 which are both identical and identically arranged in relation to the notches 44 of the clamping element 29.

The intermediate element 82 (FIGS. 12 and 13) has a body 50 with, in its lower part, a threaded tang 51 which can be screwed into the upper part 9 of the central 8 of the anchorage means 4 and has a passing hole 53 divided into an upper section 54 with an internal thread 55, a central section 54 with a smaller diameter with lateral cavities 57, an enlarged section 58 and a lower section 59 which extends to the threaded tang 51, where there is a gasket 84.

Figure 7:
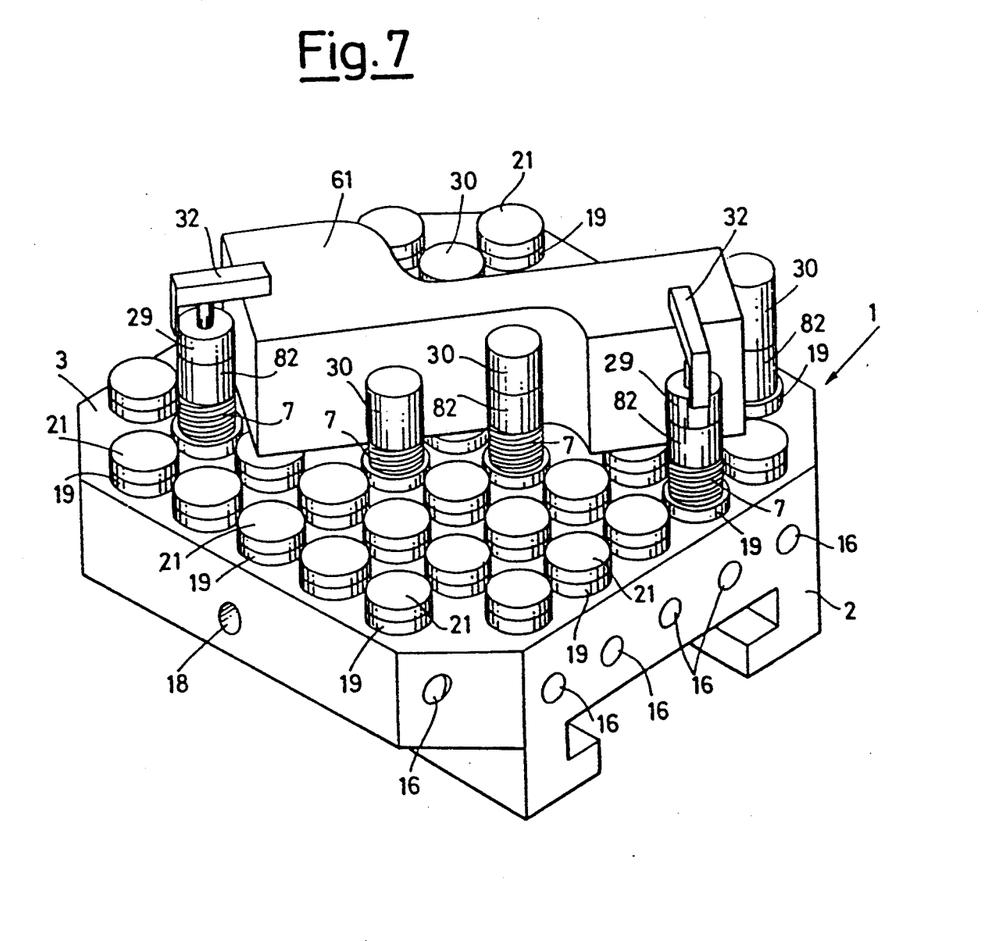
FIG. 7 is a view of the equipped pallet on which modular elements are anchored which hold a rough piece to be machined.

The upper section 54 of the hole 53 is in all respects identical to the upper section 9 of the hole 8 of the anchorage means 4 so that the intermediate element 82 may alternatively receive the tang 31 of a clamping element 29 or the tang 46 of a positioning element 30 or the tang 51 of another intermediate element 82 after being screwed onto an anchorage element 4 as shown in FIG. 7.

Figure 12:
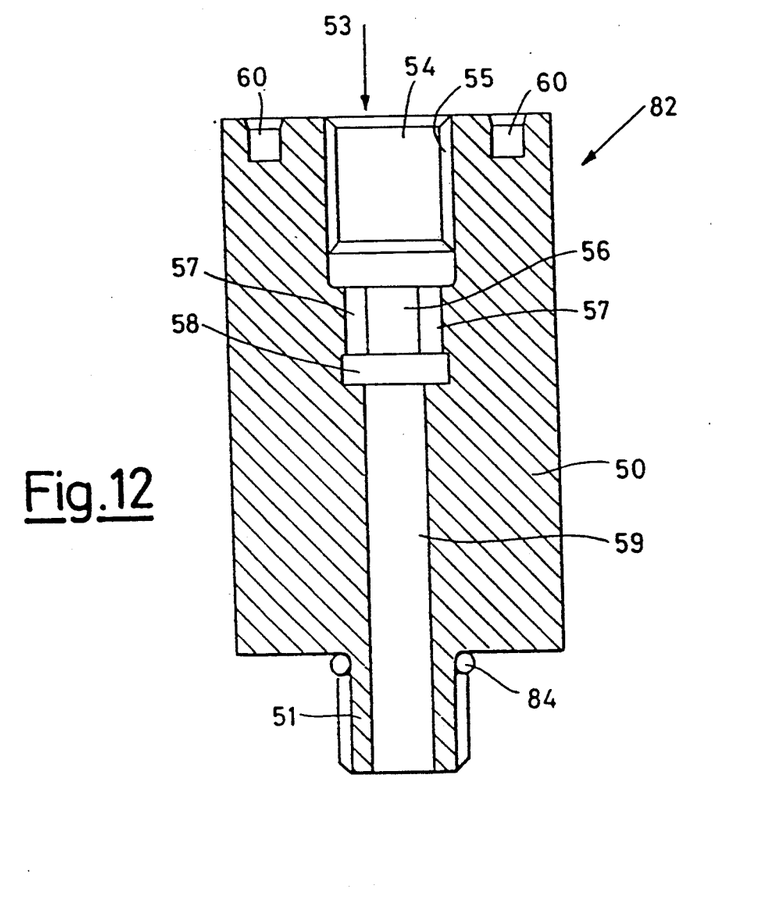
FIGS. 12 and 13 are an axial cross-sectional view and a plan view respectively of an intermediate modular element.
Figure 13:
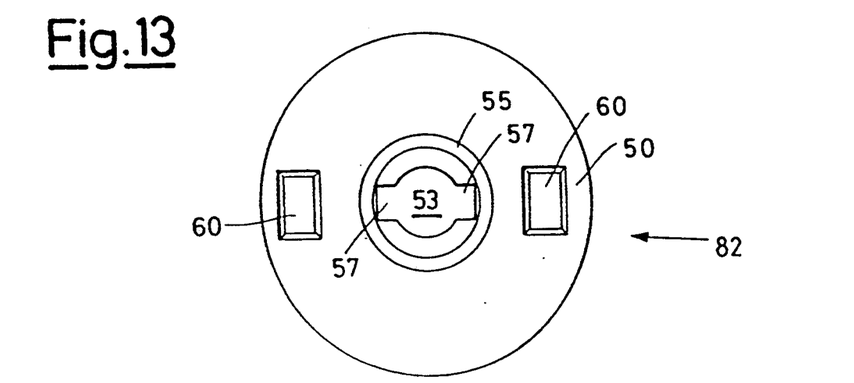

To the sides of the passing hole 53 there are two notches 60 identical with the notches 44 of the clamping elements 29 and with the notches 81 of the intermediate elements 82.

Since the plugs 21 and the modular elements 29, 30 and 82 have corresponding cavities 66, 41, 47 and 56, the same tool may be used for clamping them and moving them.

The same tool may also be used for screwing and unscrewing the clamping ring nuts 19, the plugs 21, the clamping elements 29, the positioning elements 30 and the intermediate elements 82, thanks to the cavities 20, 26, 44, 81 and 60.

The shape and the position of the cavities 66, 41, 47 and 56 are illustrated as an example, it being sufficient that they all be the same and that they be the same as the cavity 11 of the anchorage means 4 to permit the use of a single tool for the rotation of the body 7 of the anchorage means 4 and for clamping the plugs 21 and the modular elements 29, 30, 82.

The described pallet, in combination with the plugs 21 and the modular elements 29, 30 and 82, is designed to be used as follows.

Let us say, for example, that the clamping fixture is to be equipped for a rough piece 61 (FIG. 7) of which the identification features are known.

At the start of the equipping operations the pallet, as already said, has all the anchorage elements 4 sealingly closed by the plugs 21.

An operating head with independently rotating tools which can couple with the notches 26 and with the plug's cavity 24, carries out the unscrewing and the removal of a first plug 21 of a selected anchorage means 4.

After unloading the removed plug the operating head adjusts the corresponding anchorage means, loosening the ring nut 19 and screwing or unscrewing the cylindrical body 7 to the required height. Then, holding the body 7 in a fixed position, it tightens the ring nut 19 again clamping the body 7.

At this point, on the adjusted anchorage means, the operating head will screw, by means of its respective threaded tang, an appropriate modular element which may be of the clamping type 29 (FIGS. 8 and 9) or of the positioning type 30 (FIGS. 10 and 11). If the rough piece 61 has a height which is greater than the maximum which can be obtained by using only the available clamping elements 29 and the positioning elements 30, an intermediate element 82 as shown in FIG. 7 is first fastened on the anchorage means 4, after which the element 29 or 30 as required is screwed onto the intermediate element.

The same procedure is followed for other selected anchorages 4 until the clamping fixture is finished.

The operator then commands the transfer of the pallet to a clamping station with an oleodynamic coupling. Fluid under pressure is introduced through the inlet 18 into the network of channels 17 which through the conduits 15 reaches the holes 8 of the anchorage means 4. If the modular elements mounted directly or with intermediate elements 82, on the anchorages 4 without plugs are clamping elements 29, the fluid will act as a means for raising the bracket 32 to permit the positioning of the rough piece among the different components of the clamping fixture.

The oil under pressure is subsequently discharged through the cavities 33 of the clamping elements 29, so that the clamping bracket 32 will clamp against the upper surface of the piece as a result of the action of the washers 34.

The pallet with the mounted piece is now ready to be sent for machining.

I claim:

1. A pallet for mounting a clamping fixture for clamping a rough piece to be machined between said pallet and said clamping fixture, comprising:
    a supporting face provided with a plurality of holes which include threaded portions; and
    at least one anchorage means for adjustably engaging said threaded portions of the holes as to height and angular orientation about axes of the holes, the anchorage means provided with means for engaging said clamping fixture, wherein each anchorage means comprises:
    a substantially cylindrical body having an externally threaded body portion for adjustable engagement in a respective supporting face hole;
    a locking ring nut threadably engaged with the externally threaded body portion for locking the anchorage means in a desired adjusted position;
    a coaxial hole passing through said body and communicating with a fluid supply, said fluid supply for operation of a hydraulic cylinder of the clamping fixture;
    a further body portion; and
    fluid sealing means disposed between said further body portion and a portion of said supporting face hole.

2. A pallet according to claim 1, wherein said fluid supply comprises a plurality of conduits passing through a base of the pallet and communicating with at least one fluid inlet.

3. A pallet according to claim 1, wherein said coaxial hole includes a shaped portion suitable for rotatory engagement by a complementary shaped screwing and unscrewing tool.

4. A pallet according to claim 1, wherein the clamping fixture comprises:
    an axial bore having a shaped portion suitable for the introduction of a screwing and unscrewing tool; and
    a lower substantially cylindrical enlarged portion to receive and allow free rotation of said tool such that the tool axially engages the clamping fixture for removal and movement of the clamping fixture 5. A pallet according to claim 1, wherein said locking ring nut and said clamping fixture comprises:
    a pair of upper notches which are rotationally engageable with an external complementary part of a screwing and unscrewing tool.

6. A pallet according to claim 1, wherein the clamping fixture includes an internal hole which is sealingly communicable with said coaxial hole of a respective anchorage means when the clamping fixture is engaged with the anchorage means.

7. A pallet according to claim 6, and further including an intermediate element engageable between the anchorage means and the clamping fixture and which includes an internal passing hole to sealingly communicate between the coaxial hole of the respective anchorage means and the internal hole of the clamping fixture.

8. A pallet according to claim 1, wherein said means for engaging the clamping fixture comprises:
    an internally threaded portion of said coaxial hole; and
    a removable sealing plug to close said coaxial hole in the absence of the clamping fixture.

9. A pallet according to claim 1, and including a sealing plug engageable with the anchorage means in the absence of the clamping fixture which comprises:
    an axial bore having a shaped portion suitable for the introduction of a screwing and unscrewing tool; and
    a lower substantially cylindrical enlarged portion to receive and allow free rotation of said tool such that the tool axially engages the clamping fixture for removal and movement of the clamping fixture.

10. A pallet according to claim 1, and including a sealing plug engageable with the anchorage means in the absence of the clamping fixture which comprises:
    a pair of upper notches which are rotationally engageable with an external complementary part of a screwing and unscrewing tool.

11. An assembly for supporting, positioning and clamping a rough piece to be machined, comprising:
    a supporting pallet having a supporting face provided with a plurality of holes which include threaded portions;

a plurality of positioning and clamping components of a clamping fixture for clamping said rough piece between said pallet and said clamping fixture; and at least one anchorage means for adjustably engaging said threaded portions of the holes as to height and angular orientation about axes of the holes, the anchorage means provided with means for engaging the clamping fixture, wherein each anchorage means comprises:

a substantially cylindrical body having an externally threaded body portion for adjustable engagement in a respective supporting face hole;

a locking ring nut threadably engaged with the externally threaded body portion for locking the anchorage means in a desired adjusted position;

a coaxial hole passing through said body and communicating with a fluid supply, said fluid supply for operation of a hydraulic cylinder of the clamping fixture;

a further body portion; and fluid sealing means disposed between said further body portion and a portion of said supporting face hole.

12. The assembly of claim 11, wherein the clamping fixture includes a fluid inlet which is engageable with the coaxial hole when the clamping fixture is engaged with the anchorage mean.

13. The assembly of claim 11, wherein said means for engaging the clamping fixture comprises:

an internally threaded portion of said coaxial hole; and a removable sealing plug to close said coaxial hole in the absence of the clamping fixture.

14. A pallet according to claim 11, wherein said fluid supply comprises a plurality of conduits passing through a base of the pallet and communicating with at least one fluid inlet.

15. A pallet according to claim 11, wherein said coaxial hole includes a shaped portion suitable for rotatory engagement by a complementary shaped screwing and unscrewing tool.

16. A pallet according to claim 11, wherein the clamping fixture comprises:

an axial bore having a shaped portion suitable for the introduction of a screwing and unscrewing tool; and a lower substantially cylindrical enlarged portion to receive and allow free rotation of said tool such that the tool axially engages the clamping fixture for removal and movement of the clamping fixture.

17. A pallet according to claim 11, wherein said locking ring nut and said clamping fixture comprise:

a pair of upper notches which are rotationally engageable with an external complementary part of a screwing and unscrewing tool.

18. A pallet according to claim 11, wherein the clamping fixture includes an internal hole which is sealingly communicable with said coaxial hole of a respective anchorage means when the clamping fixture is engaged with the anchorage means.

19. A pallet according to claim 18, and further including an intermediate element engageable between the anchorage means and the clamping fixture and which includes an internal passing hole to sealingly communicate between the coaxial hole of the respective anchorage means and the internal hole of the clamping fixture.

20. A pallet according to claim 11, and including a sealing plug engageable with the anchorage means in the absence of the clamping fixture which comprises:

an axial bore having a shaped portion suitable for the introduction of a screwing and unscrewing tool; and a lower substantially cylindrical enlarged portion to receive and allow free rotation of said tool such that the tool axially engages the clamping fixture for removal and movement of the clamping fixture.

21. A pallet according to claim 11, and including a sealing plug engageable with the anchorage means in the absence of the clamping fixture which comprises:

a pair of upper notches which are rotationally engageable with an external complementary part of a screwing and unscrewing tool.

* * * * *